(12) United States Patent
Zhang (10) Patent No.: US 9,312,976 B2
(45) Date of Patent: Apr. 12, 2016

(54) TDMA-BASED SELF-ADAPTIVE CHANNEL SWITCHING

(75) Inventor: Yueying Zhang, Beijing (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 145 days.

(21) Appl. No.: 13/817,113

(22) PCT Filed: Nov. 7, 2011

(86) PCT No.: PCT/CN2011/081865
§ 371 (c)(1),
(2), (4) Date: Feb. 14, 2013

(87) PCT Pub. No.: WO2013/067668
PCT Pub. Date: May 16, 2013

(65) Prior Publication Data
US 2013/0250787 A1    Sep. 26, 2013

(51) Int. Cl.
*H04J 1/16* (2006.01)
*H04J 3/14* (2006.01)
*H04L 1/00* (2006.01)
*H04L 12/26* (2006.01)
*H04L 12/28* (2006.01)
(Continued)

(52) U.S. Cl.
CPC ............. *H04J 3/1694* (2013.01); *H04W 74/02* (2013.01)

(58) Field of Classification Search
CPC .. H04J 3/1694; H04W 28/0236; H04W 74/02
USPC ........................................................ 370/350
See application file for complete search history.

(56) References Cited

U.S. PATENT DOCUMENTS

| | | | |
|---|---|---|---|
| 7,852,796 B2 | 12/2010 | Wang et al. | |
| 2004/0218562 A1* | 11/2004 | Orava | H04B 1/109 370/329 |

(Continued)

FOREIGN PATENT DOCUMENTS

| | | |
|---|---|---|
| CN | 101374009 A | 2/2009 |
| EP | 0 578 260 A2 | 1/1994 |

OTHER PUBLICATIONS

International Search Report dated Aug. 16, 2012 as received in application No. PCT/CN2011/081865.

(Continued)

*Primary Examiner* — Brandon Renner
*Assistant Examiner* — Voster Preval
(74) *Attorney, Agent, or Firm* — Maschoff Brennan (57) ABSTRACT

In some examples, a method of TDMA-based self-adaptive channel-switching is described. The method may include determining multiple switching thresholds, each corresponding to a respective one of multiple communication devices within a coverage area of a wireless access point (AP). Each of the switching thresholds may be based at least on a first received signal strength indication (RSSI). The first RSSI may indicate a received signal strength at the respective one of the communication devices substantially in the absence of interference. The method may also include determining that a current RSSI at a particular one of the communication devices is less than a corresponding one of the switching thresholds. The method may also include coordinating a transition by the wireless AP and the communication devices from a carrier sense multiple access CSMA mode to a hybrid CSMA-TDMA mode.

18 Claims, 6 Drawing Sheets

(51) Int. Cl.
*H04J 3/16* (2006.01)
*H04W 74/02* (2009.01)

(56) References Cited

U.S. PATENT DOCUMENTS

| | | | |
|---|---|---|---|
| 2005/0201340 A1* | 9/2005 | Wang et al. | 370/337 |
| 2006/0176896 A1* | 8/2006 | Callaway, Jr. | H04L 1/1867 370/437 |
| 2007/0286102 A1* | 12/2007 | Shimokawa | H04W 74/08 370/310 |
| 2008/0316966 A1* | 12/2008 | Joshi | H04W 74/02 370/330 |
| 2010/0061362 A1* | 3/2010 | Wang et al. | 370/350 |
| 2010/0329221 A1* | 12/2010 | Nakano | H04W 74/0816 370/336 |

OTHER PUBLICATIONS

Written Opinion of the International Searching Authority dated Aug. 16, 2012 as received in application No. PCT/CN2011/081865.

* cited by examiner

TDMA-BASED SELF-ADAPTIVE CHANNEL SWITCHING

CROSS-REFERENCE TO RELATED APPLICATION

This Application is the U.S. National Stage filing under 35 U.S.C. §371 of PCT Application No. PCT/US11/81865 filed on Nov. 7, 2011.

BACKGROUND

Unless otherwise indicated herein, the materials described herein are not prior art to the claims in the present application and are not admitted to be prior art by inclusion in this section.

Wireless technology has seen rapid developments in recent years. Wireless networks relying on wireless technology have a number of desirable characteristics, including simplicity and convenience. As such, wireless networks have been widely deployed in numerous locations including schools, airports, office buildings, hotels, and other locations.

However, one of the characteristic problems associated with some wireless networks is wireless interference. For instance, wireless network devices that communicate in a particular frequency range may see wireless interference from nearby electronic devices that emit signals within the same frequency range, and/or from nearby wireless networks that communicate in the same frequency range.

SUMMARY

Techniques described herein generally relate to a channel switching protocol for a wireless network.

In some examples, a method of TDMA-based self-adaptive channel-switching is described. The method may include determining multiple switching thresholds, each corresponding to a respective one of multiple communication devices within a coverage area of a wireless access point (AP). Each of the switching thresholds may be based at least on a first received signal strength indication (RSSI). The first RSSI may indicate a received signal strength at the respective one of the communication devices substantially in the absence of interference. The method may also include determining that a current RSSI at a particular one of the communication devices is less than a corresponding one of the switching thresholds. The method may also include coordinating a transition by the wireless AP and the communication devices from a carrier sense multiple access CSMA mode to a hybrid CSMA-TDMA mode.

In some examples, another method of TDMA-based self-adaptive channel-switching is described. The method may include determining a first RSSI at a communication device located within a coverage area of a wireless AP. The first RSSI may indicate a received signal strength substantially in the absence of interference on a particular channel selected from a group of non-overlapping channels. The method may also include reporting the first RSSI to the wireless AP, where the wireless AP is configured to determine a switching threshold for the communication device based at least on the first RSSI. The method may also include monitoring a current RSSI at the communication device on the particular channel in the presence of interference and reporting the current RSSI to the wireless AP. The method may further include receiving, in response to the wireless AP determining that the current RSSI is less than the switching threshold, a request from the wireless AP to determine an optimal channel from among the group of non-overlapping channels. The method may also include determining the optimal channel by determining which of the channels in the group of non-overlapping channels experiences the least amount of interference at the communication device. The method may also include reporting the optimal channel to the wireless AP. The method may also include receiving an assignment from the wireless AP to the optimal channel and to a particular time period in a TDMA cycle.

In some examples, a computer storage medium having computer-executable instructions stored thereon that are executable by a computing device to perform operations is described. The operations may include determining multiple switching thresholds, each corresponding to a respective one of multiple communication devices within a coverage area of a wireless access point (AP). Each of the switching thresholds may be based at least on a first received signal strength indication (RSSI). The first RSSI may indicate a received signal strength at the respective one of the communication devices substantially in the absence of interference. The operations may also include determining that a current RSSI at a particular one of the communication devices is less than a corresponding one of the switching thresholds. The operations may also include coordinating a transition by the wireless AP and the communication devices from a carrier sense multiple access CSMA mode to a hybrid CSMA-TDMA mode.

In some examples, another computer storage medium having computer-executable instructions stored thereon that are executable by a computing device to perform operations is described. The operations may include determining a first RSSI at a communication device located within a coverage area of a wireless AP. The first RSSI may indicate a received signal strength substantially in the absence of interference on a particular channel selected from a group of non-overlapping channels. The operations may also include reporting the first RSSI to the wireless AP, where the wireless AP is configured to determine a switching threshold for the communication device based at least on the first RSSI. The operations may also include monitoring a current RSSI at the communication device on the particular channel in the presence of interference and reporting the current RSSI to the wireless AP. The operations may further include receiving, in response to the wireless AP determining that the current RSSI is less than the switching threshold, a request from the wireless AP to determine an optimal channel from among the group of non-overlapping channels. The operations may also include determining the optimal channel by determining which of the channels in the group of non-overlapping channels experiences the least amount of interference at the communication device. The operations may also include reporting the optimal channel to the wireless AP. The operations may also include receiving an assignment from the wireless AP to the optimal channel and to a particular time period in a TDMA cycle.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments described herein generally relate to a channel switching protocol for a wireless network. The channel switching protocol may be referred to herein as a TDMA-based self-adaptive channel-switching protocol. In general, a wireless network including a wireless AP and multiple communication devices operates in CSMA mode on a particular channel selected from a group of non-overlapping channels. In the CSMA mode, any of the communication devices and the wireless AP can communicate on the particular channel in compliance with a CSMA protocol.

The wireless AP determines a switching threshold for each of the communication devices based on a first RSSI for the particular channel received from each of the communication devices. Each of the communication devices monitors and periodically reports a current RSSI to the wireless AP. When the current RSSI for any of the communication devices falls below the corresponding switching threshold, the wireless AP coordinates a transition to a hybrid CSMA-TDMA mode. In the hybrid CSMA-TDMA mode, each of the communication devices can communicate with the wireless AP in compliance with the CSMA protocol on a corresponding assigned channel only during an assigned time period of a TDMA cycle. Thus, coordinating a transition to the hybrid CSMA-TDMA mode may include assigning each of the communication devices to one of the channels from the group of non-overlapping channels and assigning each of the communication devices to one of multiple time periods in the TDMA cycle.

Figure 1:
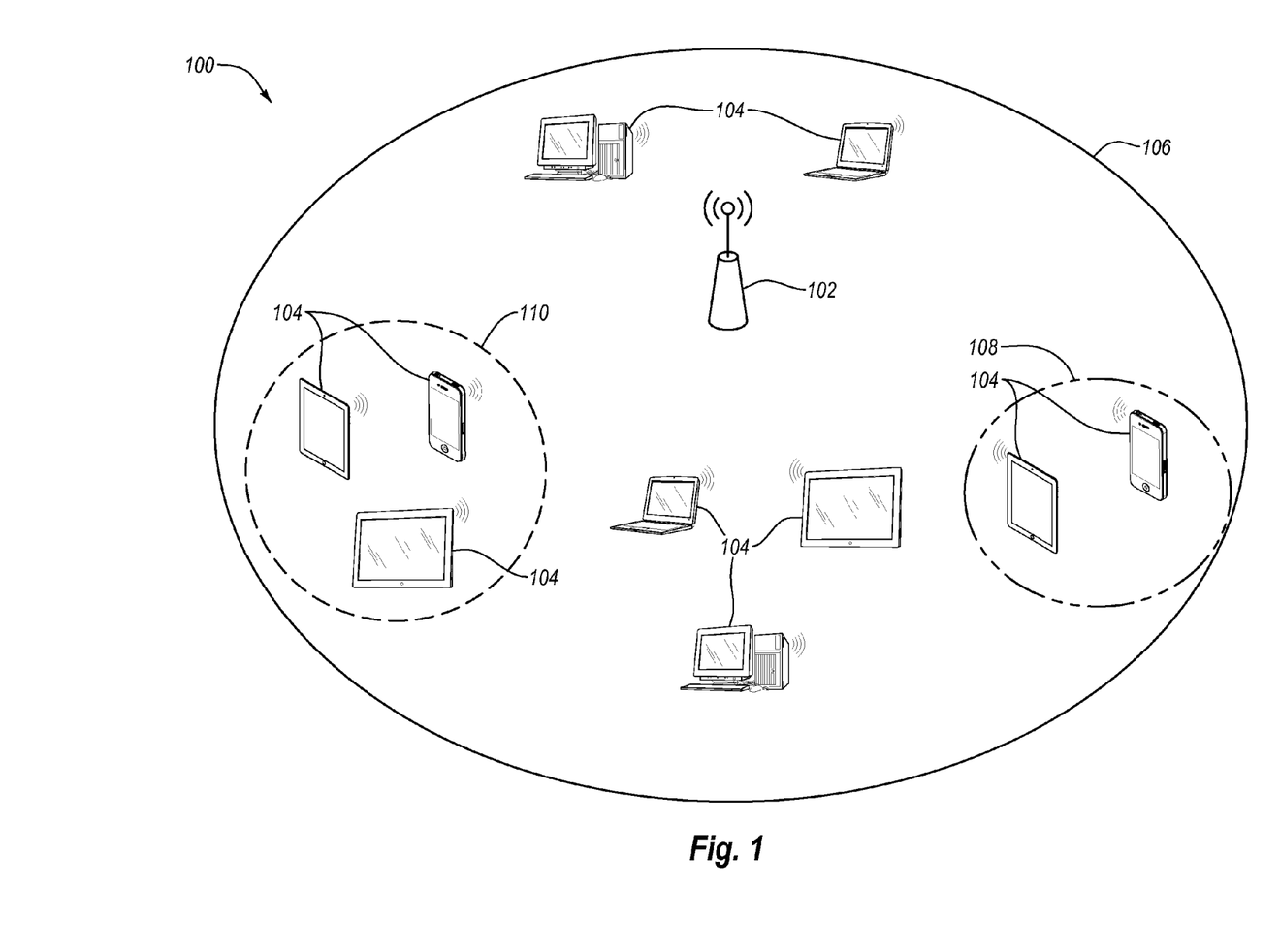
FIG. 1 is a block diagram of an example wireless network including a wireless access point (AP) and multiple communication devices.

FIG. 1 is a block diagram of an example wireless network 100 including a wireless AP 102 and multiple communication devices 104, arranged in accordance with at least some embodiments described herein. The wireless network 100 may include, but is not limited to, a cellular RF network, an 802.xx network, a Bluetooth network, or other wireless network. For instance, in some embodiments, the wireless network 100 may implement the 802.11b or 802.11g protocol, and may thus be referred to as an 802.11b or 802.11g network. Alternately or additionally, the wireless network 100 may include a wireless local area network (WLAN).

In general, the wireless AP 102 may be configured to communicate wirelessly with the communication devices 104 that are present within a coverage area 106 of the wireless AP 102. The wireless AP 102 may include, but is not limited to, a base station, an evolved Node B (eNB), an 802.11b or 802.11g AP, a Bluetooth AP, or the like or any combination thereof. In these and other embodiments, the wireless AP 102 may act as a bridge between the communication devices 104 and one or more other wireless or wired networks (not shown), such as local area networks (LANs) or WLANs, that are part of and/or are connected to one or more larger networks, such as one or more wide area networks (WANs), or the like. Accordingly, the wireless AP 102 may allow the communication devices 104 to connect to, e.g., the Internet or other global or large-scale internetworks formed by logical and physical connections between multiple WANs, LANs and/or WLANs.

The communication devices 104 may generally be configured to communicate wirelessly with the wireless AP 102 when located within the coverage area 106 of the wireless AP 102. Each communication device 104 may include, but is not limited to, a mobile phone, a smartphone, a personal digital assistant (PDA), a tablet computer, a laptop computer, a desktop, or the like or any combination thereof.

In some embodiments, the wireless AP 102 and the communication devices 104 are configured to communicate with each other over one or more frequency channels. For instance, FIG. 2 graphically illustrates some example frequency channels that may be implemented in the wireless network of FIG. 1, arranged in accordance with at least some embodiments described herein. In particular, FIG. 2 graphically illustrates fourteen channels specified by the 802.11b protocol in the 2.4 gigahertz (GHz) frequency range. Countries throughout the world apply their own regulations to both the allowable channels, allowed users and maximum power levels. For instance, the U.S. generally prohibits use of channels 12-14 in 802.11b networks. Thus, depending on the location of the wireless network 100 (FIG. 1), only a subset of the fourteen channels shown in FIG. 2 may be available.

Figure 2:
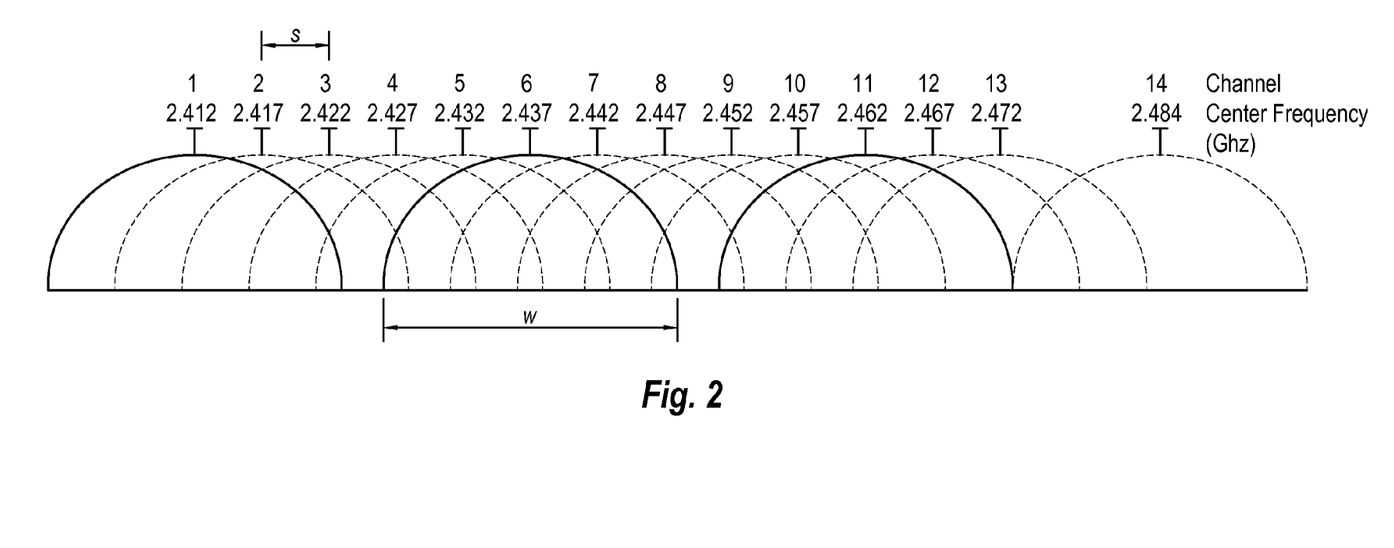
FIG. 2 graphically illustrates some example frequency channels that may be implemented in the wireless network of FIG. 1.

As can be seen in FIG. 2, adjacent channels are generally spaced at a particular channel spacing s and each of the fourteen channels is centered at a particular frequency. For instance, in the example of FIG. 2, the channel spacing s is 5 MHz, and channel 1 is centered at 2.412 GHz, channel 2 at 2.417 GHz, and so on. Additionally, each channel has the same channel width w as the other channels. In the illustrated embodiment of FIG. 2, the channel width w of each channel is 22 megahertz (MHz).

Based on the channel spacing s and the channel width w, there is some overlap between the channels. For instance, channel 6 overlaps channels 2-5 and 7-10. In some embodiments, to avoid or reduce the likelihood of interference, only non-overlapping channels may be used in the wireless network 100 (FIG. 1), such as channels 1, 6 and 11. In particular, the wireless network 100 may, at least during some time periods, utilize only one of the channels 1, 6 or 11, while other nearby wireless networks (not shown) also utilize only one of the channels 1, 6 or 11.

Returning to FIG. 1, in some embodiments, the wireless AP 102 and the communication devices 104 may communicate with each other using a carrier sense multiple access (CSMA) protocol. The CSMA protocol is a probabilistic Media Access Control protocol in which a node, such as the wireless AP 102 or a communication device 104, verifies the absence of other traffic before transmitting on a shared transmission medium, such as one of the frequency channels of FIG. 2. "Carrier sense" refers to the fact that a transmitter uses feedback from a receiver that detects a carrier wave from another node before trying to transmit. "Multiple access" refers to the fact that multiple nodes send and/or receive on the same shared transmission medium. Communication between the AP 102 and the communication devices 104 using the CSMA protocol over the same frequency channel or frequency channels may be referred to as CSMA mode.

The signals transmitted between the wireless AP 102 and the communication devices 104 may experience interference from a variety of sources that degrades the signal quality. For example, electronic devices that are not part of the wireless network 100 but are within or near the coverage area 106 of the wireless AP 102 may emit wireless signals into the coverage area 106 that are on the same or similar frequency channels as signals emitted by the wireless AP 102 and the communication devices 104. In the example of FIG. 1, two communication devices 104 experiencing interference from such an electronic device are denoted in a region 108 within the coverage area 106. For instance, and as previously indicated in the discussion of FIG. 2, the wireless AP 102 and the communication devices 104 may communicate with each other using one or more frequency channels within the 2.4 GHz frequency band. Electronic devices such as microwave ovens, cordless telephones, Bluetooth devices, wireless game consoles and other electronic devices commonly emit signals in the 2.4 GHz frequency band that can interfere with the signals emitted by the wireless AP 102 and the communication devices 104.

As another example, the signals transmitted between the wireless AP 102 and the communication devices 104 may experience interference from nearby wireless APs. In particular, as noted above, the wireless network 100 and other nearby wireless networks (not shown) may each utilize one of the non-overlapping channels 1, 6 or 11 of the 2.4 GHz frequency band shown in FIG. 2. To reduce the likelihood of co-channel interference between adjacent wireless networks, the wireless networks may utilize different frequency channels from among the non-overlapping channels 1, 6 or 11. Of course, due to the limited quantity of the non-overlapping channels 1, 6 or 11, anytime there are four or more wireless networks in a region, at least one of the non-overlapping channels 1, 6 or 11 will be utilized by at least two of the wireless networks. To the extent the coverage areas of the wireless networks that use the same frequency channel overlap or are near each other, each of the wireless networks may cause co-channel interference in at least a portion of the coverage area of the other wireless network. In the example of FIG. 1, three communication devices 104 experiencing interference from a nearby wireless network utilizing the same one of the non-overlapping channels as the wireless network 100 are denoted in a region 110 within the coverage area 106.

Accordingly, some embodiments described herein relate to suppressing interference from, e.g., electronic devices within or near the coverage area 106 of the wireless AP 102, nearby wireless networks utilizing the same frequency channel as the wireless network 100, or the like. In particular, and as will be described in greater detail below, the wireless network 100 may implement a time division multiple access (TDMA)-based self-adaptive channel-switching protocol in which the wireless network 100 operates in a hybrid CSMA-TDMA mode when detected interference within the wireless network 100 is significant, and in the CSMA mode when detected interference within the wireless network 100 is insignificant.

In more detail, the TDMA-based self-adaptive channel-switching protocol may generally be implemented in the wireless network 100 of FIG. 1 or other wireless network that, while operating in a CSMA mode, utilizes one frequency channel from among a group of non-overlapping frequency channels, such as the non-overlapping frequency channels 1, 6 and 11 of FIG. 2. The communication devices 104 each determine and report to the wireless AP 102 a strength of a signal received from the wireless AP 102 on the frequency channel in the absence or substantially in the absence of interference, referred to hereinafter as a first received signal strength indicator (RSSI). In some embodiments, the communication devices 104 each determine a first RSSI on each of the available non-overlapping frequency channels, such that each reports multiple first RSSIs to the wireless AP 102.

For each communication device 104, the wireless AP 102 may determine a switching threshold based at least on the corresponding first RSSI. For instance, the switching threshold for a first communication device 104 with a relatively high first RSSI may be selected to tolerate relatively greater loss in RSSI than the switching threshold for a second communication device 104 with a relatively low first RSSI. In the event each communication device 104 previously reports multiple first RSSIs, the wireless AP 102 may determine multiple switching thresholds for each of the communication devices 104, each of the switching thresholds corresponding to one of the non-overlapping channels based at least on the corresponding first RSSI.

In some embodiments, each switching threshold may additionally be based on the average traffic of each of the communication devices 104. For instance, the switching threshold for a communication device 104 with a relatively high amount of traffic may be selected to tolerate relatively lower loss in RSSI than the switching threshold for a communication device 104 with a relatively low amount of traffic. Alternately or additionally, the switching thresholds determined by the wireless AP 102 may be stored in a table or other data structure in memory or in another computer storage medium available to the wireless AP 102.

In some embodiments, each switching threshold may be expressed as an RSSI switching threshold—when a current RSSI of a communication device 104 falls below the RSSI switching threshold, the wireless network 100 may transition to the hybrid CSMA-TDMA mode as explained below. Alternately, each switching threshold may be expressed as an RSSI loss switching threshold—when the difference between the first RSSI and a current RSSI, or the RSSI loss, of a communication device 104 exceeds the corresponding RSSI loss switching threshold, the wireless network 100 may transition to the hybrid CSMA-TDMA mode. Each switching threshold may be expressed in other manners and the foregoing examples are meant to be illustrative only, and not restrictive. In the discussion that follows, example embodiments may be described in which the switching threshold is expressed as an RSSI switching threshold, with the understanding that the embodiments may be appropriately adapted when the switching threshold is expressed in some other manner, such as an RSSI loss switching threshold.

In operation, the communication devices 104 may each be configured to monitor, in the presence of interference, a current RSSI on the frequency channel being utilized in the wireless network 100, and to report the current RSSI to the wireless AP 102.

The wireless AP 102 may receive the current RSSI from each of the communication devices 104 and may compare each to the corresponding switching threshold. When the current RSSI of at least one of the communication devices 104 falls below the corresponding switching threshold, the wireless AP 102 may coordinate a transition from the CSMA mode of operation to the hybrid CSMA-TDMA mode of operation. For example, the wireless AP 102 may request that each of the communication devices 104 whose current RSSI is below its switching threshold identify, to the wireless AP, an optimal channel of the communication device 104.

Each communication device 104 may determine its optimal channel by determining which of the channels in the group of non-overlapping channels is experiencing the least amount of interference at the communication device. The determination of the optimal channel may be made in response to the request from the wireless AP, or at any other time. The optimal channel determined for a communication device 104 may be the same one of the non-overlapping channels that was previously in use, or a different one of the non-overlapping channels. The optimal channels may be reported to the wireless AP 102.

The wireless AP 102 may continue coordinating the transition to the hybrid CSMA-TDMA mode by assigning each of the communication devices 104 to one of the non-overlapping channels. For instance, those communication devices 104 whose current RSSI is below the corresponding switching threshold can be assigned to the corresponding optimal channel. Alternately or additionally, those communication devices 104 whose current RSSI is above the corresponding threshold can be assigned to the same non-overlapping channel that was previously in use.

Each of the communication devices 104 may also be assigned by the wireless AP 102 to a particular time period in a repeating TDMA cycle. Prior to making the time period assignments, the wireless AP 102 may divide the TDMA cycle into multiple time periods. The number of time periods may be based on a number of the distinct non-overlapping channels to which the communication devices 104 are assigned. For example, if the communication devices 104 are variously assigned to either two or three distinct non-overlapping channels, the TDMA cycle may be divided into either two or three time periods, respectively.

Alternately or additionally, the wireless AP 102 may determine a length of each of the assigned time periods. The determination may be based on, for instance, the quantity of the communication devices 104 in the coverage area 106, an average traffic amount of each of the communication devices 104, or the like or any combination thereof.

Figure 3:
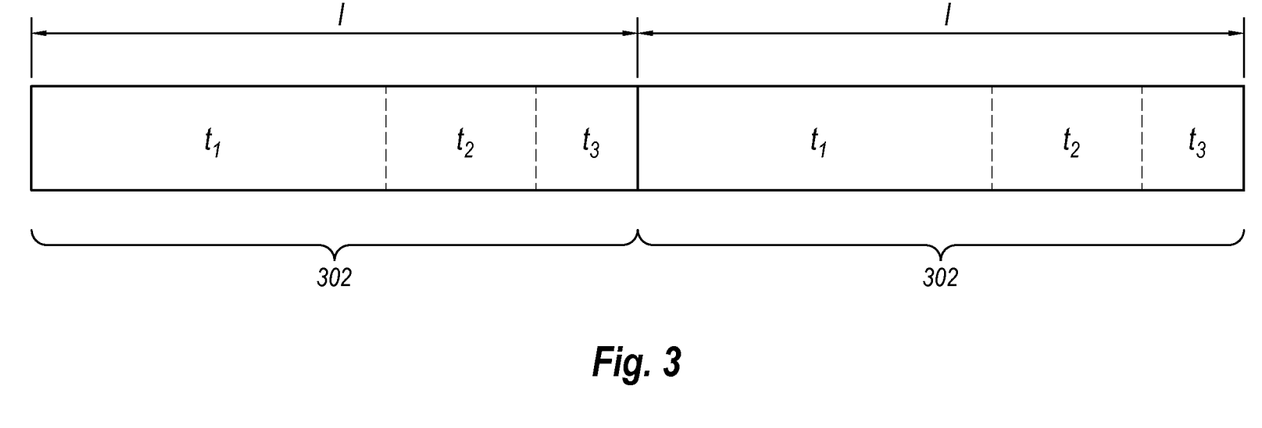
FIG. 3 is a schematic diagram of a repeating Time Division Multiple Access (TDMA) cycle.

For example, FIG. 3 is a schematic diagram of a repeating TDMA cycle 302, arranged in accordance with at least some embodiments described herein. As shown in FIG. 3, the TDMA cycle 302 may have a temporal length/that remains the same for each TDMA cycle 302. FIG. 3 additionally illustrates that the TDMA cycle 302 may be divided into multiple time periods $t_1$, $t_2$ and $t_3$ to which the communication devices 104 can be assigned.

An example embodiment will now be described with combined reference to FIGS. 1-3. As long as the current RSSI of each of the communication devices 104 remains above the corresponding switching threshold, the wireless network 100 operates in the CSMA mode in which any of the communication devices 104 and the wireless AP 102 can communicate on a particular channel selected from among the non-overlapping channels at any time in compliance with the CSMA protocol. The particular channel may be channel 1, for instance.

In the present example, the communication devices 104 within the region 108 may experience interference on the particular channel from a nearby electronic device such that the current RSSI of each of the communication devices 104 within the region 108 falls below the corresponding switching threshold. Moreover, in response to a request from the wireless AP 102, each of the communication devices 104 within the region 108 may identify to the wireless AP 102 a different one of the non-overlapping channels, such as channel 11, as the optimal channel for that communication device. Similarly, the communication devices 104 within the region 110 may experience interference, such as from a nearby wireless network, that causes the corresponding current RSSI to fall below the corresponding switching threshold, and each of the communication devices 104 within the region 110 may identify a different one of the non-overlapping channels, such as channel 6, as the optimal channel for that communication device.

The wireless AP 102 may then assign each of the communication devices 104 to a corresponding one of the non-overlapping channels. For instance, those communication devices 104 whose current RSSI has not fallen below the corresponding switching threshold, such as the five communication devices 104 outside of the regions 108 or 110 and within the coverage area 106, may be assigned to the particular channel that was previously in use, which is channel 1 in the present example. The two communication devices 104 within the region 110 may be assigned to the optimal channel identified by each, which is channel 11 in this example. The three communication devices 104 within the region 110 may be assigned to the optimal channel identified by each, which is channel 6 in this example.

The wireless AP 102 may then divide the TDMA cycle 302 into multiple time periods, the number of which depends on the number of assigned channels. Since, in this example, there are three assigned channels, the TDMA cycle 302 is divided into three time periods $t_1$, $t_2$ and $t_3$. In this example, each of the communication devices 104 is assigned to the same time period $t_1$, $t_2$ or $t_3$ as the other communication devices 104 that have the same channel assignment. For instance, all of the communication devices 104 assigned to channel 1, 6 or 11 are respectively assigned to time period $t_1$, $t_2$ or $t_3$ in this example. In particular, the five communication devices 104 outside of regions 108 and 110 may be assigned to channel 1 and time period $t_1$, the two communication devices 104 in region 108 may be assigned to channel 11 and time period $t_3$, and the three communication devices 104 in region 110 may be assigned to channel 6 and time period $t_2$.

The length of the time periods $t_1$, $t_2$ and $t_3$ may be determined by the wireless AP 102 based on one or more of the number of communication devices 104 in the coverage area 106 or an average traffic amount of each of the communication devices 104. For instance, since there are five communication devices 104 assigned to the time period $t_1$ versus only two assigned to time period $t_3$ and only three assigned to time period $t_2$ in the present example, the wireless AP 102 may have determined to make the time period $t_1$ shown in FIG. 3 longer than either of the other time periods $t_2$ or $t_3$.

While the wireless network 100 is operating in the hybrid CSMA-TDMA mode, each of the communication devices 104 can communicate with the wireless AP 102 in compliance with the CSMA protocol on the corresponding assigned channel only during the time period $t_1$, $t_2$ or $t_3$ of each TDMA cycle 302 to which the communication device 104 is assigned 104. During the other time periods of each TDMA cycle 302 to which the communication devices 104 are not assigned, the communication devices 104 do not attempt to transmit any signals and may go into hibernation. For instance, the five communication devices 104 assigned to channel 1 and time period $t_1$ may communicate with the wireless AP 102 in compliance with the CSMA protocol on channel 1 only during the time period $t_1$—during periods $t_2$ and $t_3$, these five communication devices 104 may not attempt to transmit any signals and may go into hibernation. Similarly, the two communication devices 104 assigned to channel 11 and time period $t_3$ may communicate with the wireless AP 102 in compliance with the CSMA protocol on channel 11 only during the time period $t_3$—during periods $t_1$ and $t_2$, these two communication devices 104 may not attempt to transmit any signals and may go into hibernation. Similarly, the three communication devices 104 assigned to channel 6 and time period $t_2$ may communicate with the wireless AP 102 in compliance with the CSMA protocol on channel 6 only during the time period $t_2$—during periods $t_1$ and $t_3$, these three communication devices 104 may not attempt to transmit any signals and may go into hibernation.

In these and other embodiments, the wireless AP 102 may detect whether interference has disappeared by periodically sending detection signals. For instance, the wireless AP 102 may periodically request current RSSIs from the communication devices 104; after all RSSIs are above corresponding switching thresholds for a predetermined amount of time, the wireless AP 102 may determine that the interference has disappeared. In response to detecting that the interference has disappeared, the wireless AP 102 may instruct the communication devices 104 to terminate operation in the hybrid CSMA-TDMA mode and return to operation in the CSMA mode.

Figure 4:
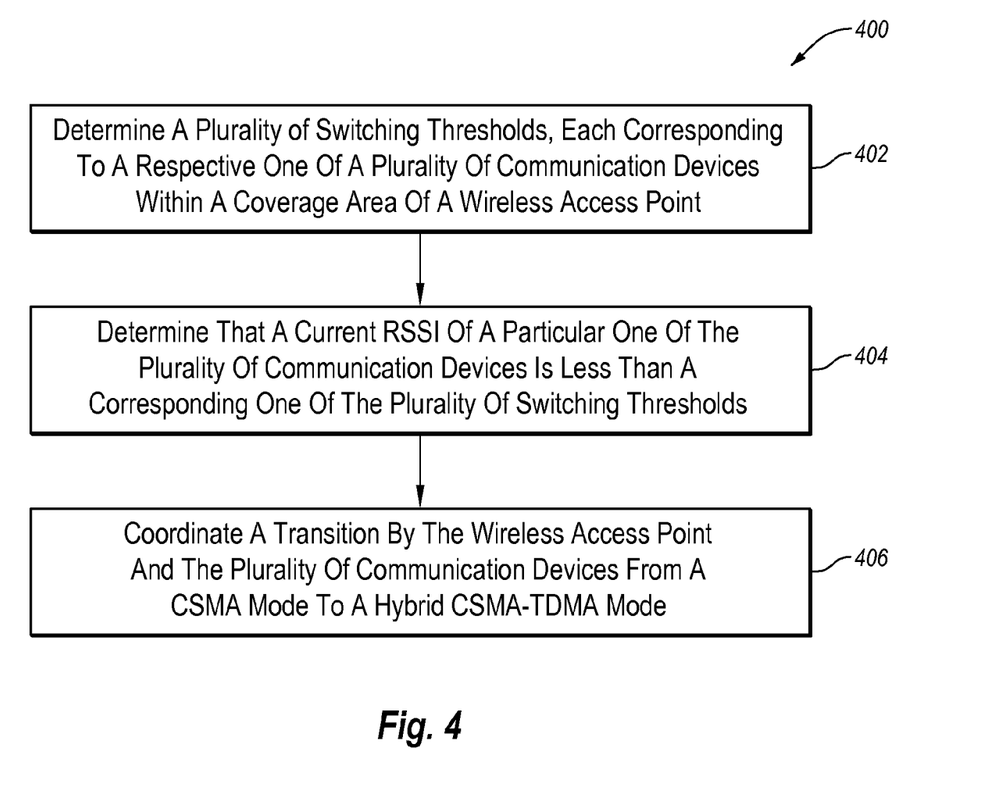
FIG. 4 shows an example flow diagram of a method of TDMA-based self-adaptive channel-switching.

FIG. 4 shows an example flow diagram of a method 400 of TDMA-based self-adaptive channel-switching, arranged in accordance with at least some embodiments described herein. The method 400 may be performed in whole or in part by, e.g., the wireless AP 102 of FIG. 1. The method 400 includes various operations, functions or actions as illustrated by one or more of blocks 402, 404 and/or 406. The method 400 may begin at block 402.

In block 402, a multiple number of switching thresholds are determined by, for example, a wireless AP. Each switching threshold may correspond to a respective one of multiple communication devices within a coverage area of the wireless AP. The wireless AP and communication devices may include the wireless AP 102 and communication devices 104 of FIG. 1, for example.

Each of the switching thresholds may be based at least on a first RSSI indicating a received signal strength at the respective communication device in the absence or substantially in the absence of interference such as co-channel interference. For instance, a switching threshold for a communication device having a relatively high first RSSI may be lower than a switching threshold for a communication device having a relatively low first RSSI.

Alternately or additionally, each of the switching thresholds may be based on an average amount of traffic of the respective communication device. For instance, a switching threshold for a communication device having a relatively high average amount of traffic may be lower than a switching threshold for a communication device having a relatively low average amount of traffic. Block 402 may be followed by block 404.

In block 404, a current RSSI of a particular one of the communication devices is determined to be less than a corresponding one of the switching thresholds. In some embodiments, determining that the current RSSI of the particular one of the communication devices is less than the corresponding one of the switching thresholds is performed by the wireless AP. For instance, the wireless AP may compare the current RSSI for each of the communication devices to the corresponding switching threshold to make the determination. Block 404 may be followed by block 406.

In block 406, a transition by the wireless AP and the communication devices from a CSMA mode to a hybrid CSMA-TDMA mode is coordinated. The coordinating of the transition from the CSMA mode to the hybrid CSMA-TDMA may be performed by the wireless AP, for instance. In these and other embodiments, coordinating the transition from the CSMA mode to the hybrid CSMA-TDMA mode may include assigning the particular one of the communication devices to an optimal channel selected from a group of non-overlapping channels, where interference at the particular one of the communication devices on the optimal channel is less than interference at the particular one of the communication devices on one or more remaining channels included in the group of non-overlapping channels. In some embodiments, coordinating the transition may additionally include assigning the particular one of the communication devices to a particular time period in a TDMA cycle. Alternately or additionally, coordinating the transition may include assigning a multiple number of the communication devices to respective optimal channels selected from the group of non-overlapping channels and assigning each of the multiple number of the communication devices to particular time periods in the TDMA cycle.

Although not required, in some embodiments, in the CSMA mode, the wireless AP and the communication devices implement the CSMA protocol on a single frequency channel.

Alternately or additionally, in the hybrid CSMA-TDMA mode, the wireless AP and a first subset of the communication devices implement the CSMA protocol during a first time period in a TDMA cycle on a first frequency channel, and the wireless AP and a second subset of the communication devices implement the CSMA protocol during a second time period in the TDMA cycle on a second frequency channel that does not overlap with the first frequency channel.

Some embodiments disclosed herein include a computer storage medium having computer-executable instructions stored thereon that are executable by the computing device to perform operations included in the method 400 of FIG. 4, such as the operations illustrated by blocks 402, 404 and/or 406 in FIG. 4, and/or variations thereof. The computer storage medium may be included in, for instance, the wireless AP 102 of FIG. 1, and the computer-executable instructions may be executable by the wireless AP 102. More particularly, the wireless AP 102 may include a processor, controller, or other computing device that can execute the computer-executable instructions.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 400 may further include, prior to assigning a multiple number of communication devices to particular time periods in a TDMA cycle, dividing the TDMA cycle into multiple time periods including the particular time periods. A number of the multiple time periods may be determined based on a number of distinct channels to which all of the communication devices are assigned. For instance, if the communication devices are assigned to three distinct channels, the TDMA cycle may be divided into three time periods. The method 400 may further include determining a length of each of the time periods. The length of each time period may be determined based on a quantity of the communication devices, or more particularly, a quantity of communication devices assigned to each channel, and/or on an average traffic amount for each of the communication devices.

Alternately or additionally, the method 400 may further include, prior to coordinating the transition from the CSMA mode to the hybrid CSMA-TDMA mode, determining that a current RSSI of each of the multiple number of communication devices is less than a corresponding switching threshold. In these and other embodiments, the method 400 may further include, prior to assigning the particular one and the multiple number of communication devices to respective optimal channels, requesting and receiving an identification of the respective optimal channels from the particular one and the multiple number of the communication devices.

In some embodiments, the method 400 may further include, prior to determining the switching thresholds, receiving, from each of the communication devices, the respective first RSSI. In these and other embodiments, the method 400 may further include, prior to determining that a current RSSI of a particular one of the communication devices is less than a corresponding one of the switching thresholds, periodically receiving a current RSSI from each of the communication devices.

Alternately or additionally, the method 400 may further include determining that a source of interference with an initial channel has disappeared, the source of interference having caused the current RSSI to be reduced to a value below the corresponding one of the plurality of switching thresholds. In response to determining that the source of interference has disappeared, the method 400 may further include coordinating a transition by the wireless AP and the communication devices from the hybrid CSMA-TDMA mode to the CSMA mode on the initial channel.

Figure 5:
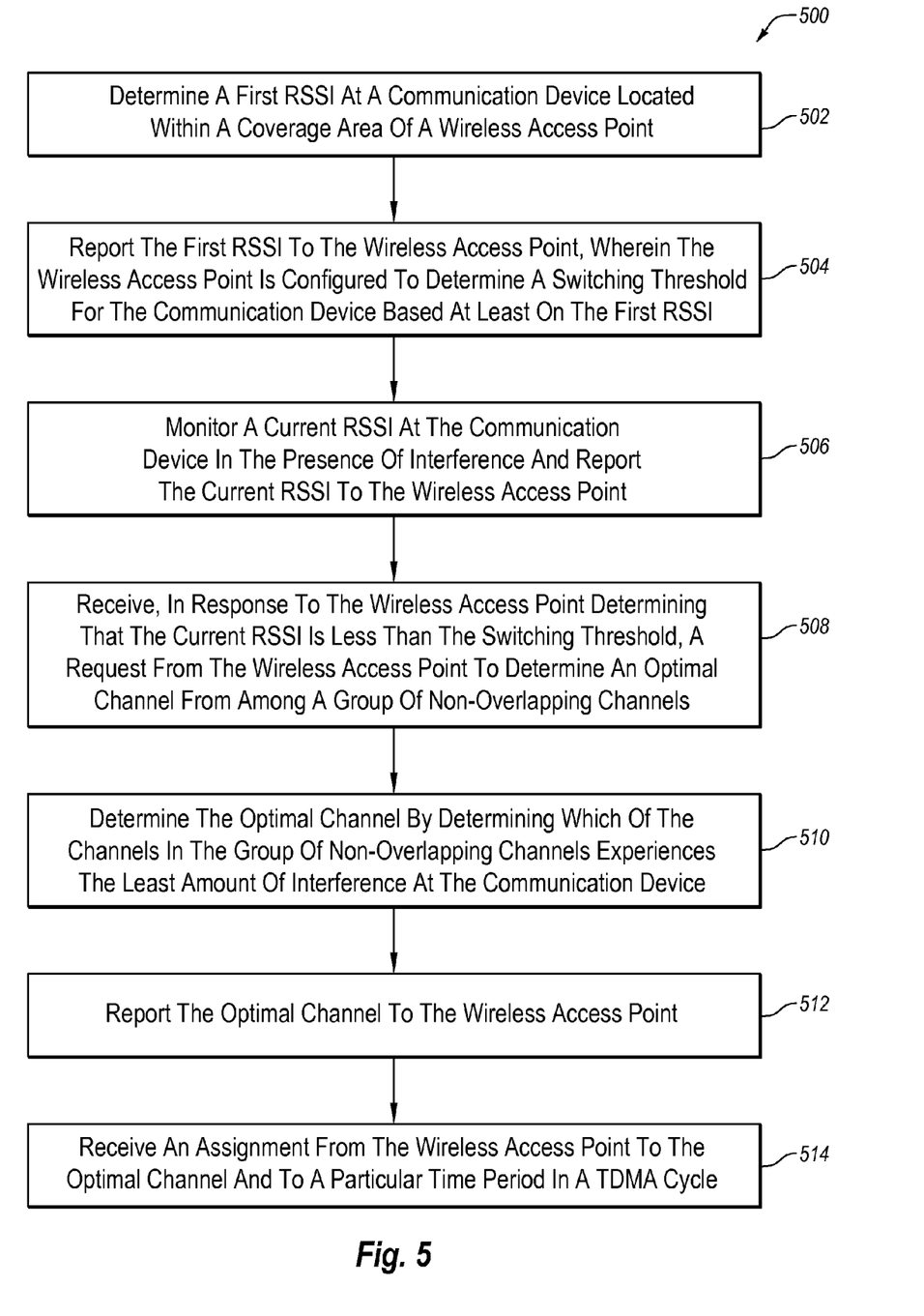
FIG. 5 shows an example flow diagram of another method of TDMA-based self-adaptive channel-switching.

FIG. 5 shows an example flow diagram of another method 500 of TDMA-based self-adaptive channel-switching, arranged in accordance with at least some embodiments described herein. The method 500 may be performed in whole or in part by, e.g., one or more of the communication devices 104 of FIG. 1. The method 500 includes various operations, functions or actions as illustrated by one or more of blocks 502, 504, 506, 508, 510, 512 and/or 514. The method 500 may begin at block 502.

In block 502, a first RSSI is determined at a communication device located within a coverage area of a wireless AP. The communication device and the wireless AP may include one of the communication devices 104 and the wireless AP 102 of FIG. 1, for example. In some embodiments, the first RSSI indicates a received signal strength in the absence of or substantially in the absence of interference on a particular channel selected from a group of non-overlapping channels. For instance, the particular channel may be channel 1, 6 or 11 of the 2.4 GHz spectrum described above with respect to FIG. 2. Block 502 may be followed by block 504.

In block 504, the first RSSI is reported to the wireless AP. In these and other embodiments, the wireless AP may be configured to determine a switching threshold for the communication device based at least on the first RSSI. Block 504 may be followed by block 506.

In block 506, a current RSSI is monitored at the communication device in the presence of interference, and the current RSSI is reported to the wireless AP. The interference may include co-channel interference caused by a nearby electronic device emitting signals on or near the particular channel, or by a nearby wireless network communicating using the particular channel. Block 506 may be followed by block 508.

In block 508, in response to the wireless AP determining that the current RSSI is less than the switching threshold, a request is received from the wireless AP to determine an optimal channel from among the group of non-overlapping channels. Block 508 may be followed by block 510.

In block 510, the optimal channel is determined by determining which of the channels in the group of non-overlapping channels experiences the least amount of interference at the communication device. In these and other embodiments, the optimal channel may include the channel determined to experience the least amount of interference. Block 510 may be followed by block 512.

In block 512, the optimal channel is reported to the wireless AP. Block 512 may be followed by block 514.

In block 514, an assignment is received from the wireless AP to the optimal channel and to a particular time period in a TDMA cycle.

In some embodiments, the method 500 may further include, in response to receiving the assignment from the wireless AP, implementing, together with the wireless AP, a CSMA protocol on the optimal channel during the particular time period in the TDMA cycle, and hibernating during one or more other time periods in the TDMA cycle.

Alternately or additionally, the determination that the current RSSI is less than the switching threshold may indicate a source of interference with the particular channel over which the communication module initially communicates with the wireless AP. In these and other embodiments, the method 500 may further include receiving an indication from the wireless AP indicating that the source of interference has disappeared. The method 500 may additionally include resuming communication with the wireless AP over the particular channel, including implementing the CSMA protocol on the particular channel.

Some embodiments disclosed herein include a computer storage medium having computer-executable instructions stored thereon that are executable by the computing device to perform operations included in the method 500 of FIG. 5, such as the operations illustrated by blocks 502, 504, 506, 508, 510, 512, and/or 514 in FIG. 5, and/or variations thereof. The computer storage medium may be included in, for instance, one of the communication devices 104 of FIG. 1, and the computer-executable instructions may be executable by the communication device 104. More particularly, the communication device 104 may include a processor, controller, or other computing device that can execute the computer-executable instructions.

Figure 6:
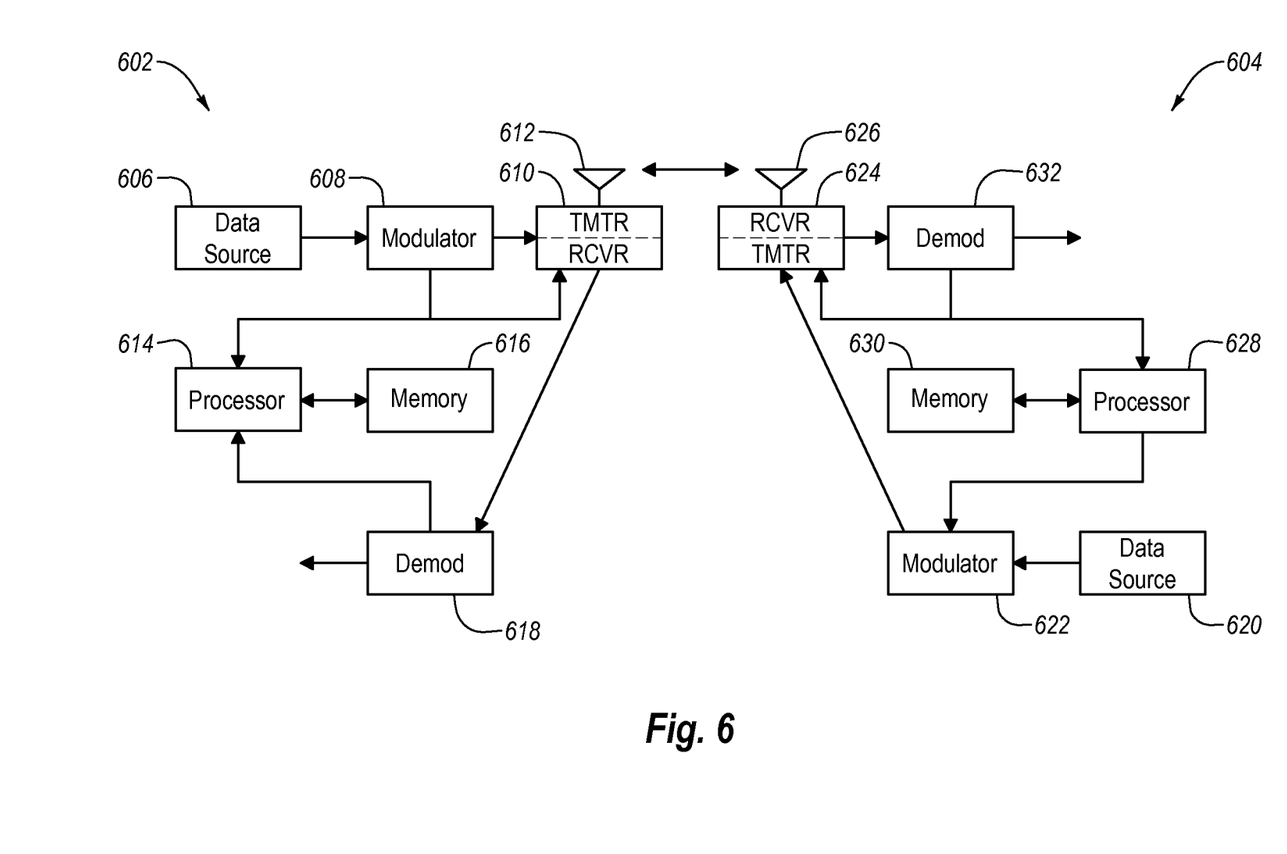
FIG. 6 is a block diagram of an example wireless AP and communication device, all arranged in accordance with at least some embodiments described herein.

FIG. 6 is a block diagram of an example wireless AP 602 and communication device 604, arranged in accordance with at least some embodiments described herein. The wireless AP 602 of FIG. 6 may correspond to the wireless AP 102 of FIG. 1. Alternately or additionally, the communication device 604 may correspond to any one of the communication devices 104 of FIG. 1.

In the illustrated embodiment, the wireless AP 602 may include, for example, a data source 606, a modulator 608, one or more transceivers 610, one or more antennas 612, a processor 614, a memory or other computer-readable storage medium 616, and a demodulator (Demod) 618. The transceiver 610 may include a transmitter (TMTR) and a receiver (RCVR).

Alternately or additionally, the communication device 604 may include, for example, a data source 620, a modulator 622, one or more transceivers 624, one or more antennas 626, a processor 628, a memory or other computer-readable storage medium 630, and a demodulator (Demod) 632. The transceiver 624 may include a transmitter (TMTR) and a receiver (RCVR).

An example embodiment of operation of the components of the wireless AP 602 and the communication device 604 that are depicted in FIG. 6 will now be described. At the wireless AP 602, traffic data may be provided from the data source 606 to the modulator 608. The modulator 608 may format, code and symbol map the traffic data based on a particular modulation scheme to generate a modulation signal that may be provided to the transmitter (TMTR) of the transceiver 610.

The data rate, coding, and modulation for the traffic data may be determined by the processor 614 executing computer-executable instructions stored on the memory 616. Alternately or additionally, the processor 614 may execute computer-executable instructions stored on the memory 616 or other location that are effective to cause the wireless AP 602 to perform one or more of the other operations described herein. The memory 616 may store computer-executable instructions such as program code, as well as data, and/or other information used by the processor 614 or other components of the wireless AP 602.

The transceiver 610 may receive and process the modulation signal to provide one or more analog signals, and may further condition (e.g., amplify, filter, and/or upconvert) the analog signals to provide a modulated signal suitable for transmission over one or more of a group of non-overlapping channels available for communication between the wireless AP 602 and the communication device 604. Modulated signals from the transceiver 610 are then transmitted from the antenna 612.

At the communication device 604, the transmitted modulated signals may be received by the antenna 626 and the received signal from the antenna 626 may be provided to the transceiver 624. The transceiver 624 may condition (e.g., filter, amplify, and/or downconvert) a respective received signal, digitize the conditioned signal to provide samples, and further process the samples to provide a corresponding "received" symbol stream. The "received" symbol stream may be demodulated and decoded by the demodulator 632 to recover the traffic data. The processing by the transceiver 624 and demodulator 632 of the communication device 604 may be complementary to that performed by the transceiver 610 and the modulator 608 of the wireless AP 602.

The processor 628 may execute computer-executable instructions stored on the memory 632 or other location that are effective to cause the communication device 604 to perform one or more of the operations described herein, such as detecting RSSI, operating in compliance with the CSMA protocol, hibernating during unassigned periods of a TDMA cycle, and the like. The memory 630 may store computer executable instructions such as program code, as well as data and/or other information used by the processor 628 or other components of the communication device 604.

The data source 620, the modulator 622 and the transceiver 624 of the communication device 604 permit the communication device 604 to transmit traffic data to the wireless AP 602 in much the same way that traffic data is transmitted to the communication device 604 by the wireless AP 602. Similarly, the transceiver 610 and the demodulator 618 of the wireless AP 602 permit the wireless AP 602 to receive traffic data from the communication device 604 in much the same way that traffic data is received by the communication device 604 from the wireless AP 602.

In the illustrated embodiment of FIG. 6, one or both of the processors 614, 628 may receive signals from, e.g., the transceivers 610, 624, respectively, representing the RSSI at the corresponding transceiver 610, 624. Alternately or additionally, the traffic data recovered by the demodulator 618 of the wireless AP 602 may include the periodically reported RSSI of the communication device that is provided to the processor 614 for processing in accordance with the described embodiments, while the traffic data recovered by the demodulator 632 may include requests for an optimal channel or instructions from the wireless AP 602 to switch between the CSMA mode and the hybrid CSMA-TDMA mode described herein.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method of TDMA-based self-adaptive channel-switching, the method comprising:
 determining a plurality of switching thresholds, each corresponding to a respective one of a plurality of communication devices within a coverage area of a wireless access point, wherein each of the plurality of switching thresholds is based at least on a first received signal strength indication (RSSI), the plurality of communication devices including a first communication device associated with a first switching threshold from the plurality of switching thresholds and a second communication device associated with a second switching threshold from the plurality of switching thresholds, the plurality of communication devices being assigned with an initial frequency channel from a group of non-overlapping frequency channels while operating in a carrier sense multiple access (CSMA) mode;
 determining that a current RSSI of the first communication device is less than the first switching threshold that corresponds to the first communication device;
 determining that a current RSSI of the second communication device is above the second switching threshold that corresponds to the second communication device; and
 coordinating a transition by the wireless access point and the plurality of communication devices from the CSMA mode to a hybrid CSMA-time division multiple access (TDMA) mode, the coordinating including:
  assigning the first communication device with a first frequency channel selected from the group of non-overlapping frequency channels responsive to the current RSSI of the first communication device being less than the first switching threshold; and
  assigning the second communication device with the initial frequency channel responsive to the current RSSI of the second communication device being above the second switching threshold.

2. The method of claim 1, wherein coordinating the transition from the CSMA mode to the hybrid CSMA-TDMA mode further includes:
 assigning the first communication device to a first time period in a TDMA cycle; and
 assigning the second communication device to a second time period in the TDMA cycle,
 wherein the first frequency channel includes an optimal channel selected from the group of non-overlapping frequency channels, and interference at the first communication device on the optimal channel is less than interference at the first communication device on one or more remaining frequency channels from the group of non-overlapping frequency channels.

3. The method of claim 2, wherein coordinating the transition from the CSMA mode to the hybrid CSMA-TDMA mode further includes assigning a multiple number of the plurality of communication devices to respective optimal channels selected from the group of non-overlapping frequency channels and assigning each of the multiple number of the plurality of communication devices to particular time periods in the TDMA cycle.

4. The method of claim 3, further comprising, prior to assigning each of the multiple number of the plurality of communication devices to particular time periods in the TDMA cycle:
 dividing the TDMA cycle into a plurality of periods including the particular time periods, a number of the plurality of periods being determined based on a number of distinct frequency channels to which the plurality of communication devices are assigned; and
 determining a length of each of the plurality of periods based on a quantity of the plurality of communication devices and an average traffic amount for the plurality of communication devices.

5. The method of claim 3, further comprising:
 prior to coordinating the transition from the CSMA mode to the hybrid CSMA-TDMA mode, determining that a current RSSI of each of the multiple number of the plurality of communication devices is less than a corresponding one of the plurality of switching thresholds; and
 prior to assigning the first communication device and the multiple number of the plurality of communication devices to respective optimal channels, requesting and receiving an identification of the respective optimal channels from the first communication device and the multiple number of the plurality of communication devices.

6. The method of claim 1, further comprising:
 prior to determining the plurality of switching thresholds, receiving, from each of the plurality of communication devices, the respective first RSSI; and prior to determining that the current RSSI of the first communication device is less than the first switching threshold, periodically receiving a corresponding current RSSI from each of the plurality of communication devices.

7. The method of claim 1, wherein:
each of the plurality of switching thresholds is further based on an average amount of traffic of the respective one of the plurality of communication devices; and
a switching threshold for a communication device having a relatively high average amount of traffic is lower than a switching threshold for a communication device having a relatively low average amount of traffic.

8. The method of claim 1, wherein:
in the CSMA mode, the wireless access point and the plurality of communication devices implement a CSMA protocol on the initial frequency channel; and
in the hybrid CSMA-TDMA mode:
the wireless access point and a first subset of the plurality of communication devices implement the CSMA protocol during a first time period in a TDMA cycle on the first frequency channel, the first subset of the plurality of communication devices including the first communication device; and
the wireless access point and a second subset of the plurality of communication devices implement the CSMA protocol during a second time period in the TDMA cycle on the initial frequency channel that does not overlap with the first frequency channel, the second subset of the plurality of communication devices including the second communication device.

9. The method of claim 1, further comprising:
determining that a source of interference with the initial frequency channel has disappeared, the source of interference having caused the current RSSI of the first communication device to be reduced to a value below the first switching threshold; and
in response to determining that the source of interference has disappeared, coordinating a transition by the wireless access point and the plurality of communication devices from the hybrid CSMA-TDMA mode to the CSMA mode on the initial frequency channel.

10. A computer-readable storage medium having computer-readable instructions stored thereon that are executable by a computing device to perform operations comprising:
determining a plurality of switching thresholds, each corresponding to a respective one of a plurality of communication devices within a coverage area of a wireless access point, wherein each of the plurality of switching thresholds is based at least on a first received signal strength indication (RSSI), the plurality of communication devices including a first communication device associated with a first switching threshold from the plurality of switching thresholds and a second communication device associated with a second switching threshold from the plurality of switching thresholds, the plurality of communication devices being assigned with an initial frequency channel from a group of non-overlapping frequency channels while operating in a carrier sense multiple access (CSMA) mode;
determining that a current RSSI of the first communication device is less than the first switching threshold that corresponds to the first communication device;
determining that a current RSSI of the second communication device is above the second switching threshold that corresponds to the second communication device; and
coordinating a transition by the wireless access point and the plurality of communication devices from the CSMA mode to a hybrid CSMA-time division multiple access (TDMA) mode, the coordinating including:
assigning the first communication device with a first frequency channel selected from the group of non-overlapping frequency channels responsive to the current RSSI of the first communication device being less than the first switching threshold; and
assigning the second communication device with the initial frequency channel responsive to the current RSSI of the second communication device being above the second switching threshold.

11. The computer-readable storage medium of claim 10, wherein coordinating the transition from the CSMA mode to the hybrid CSMA-TDMA mode further includes:
assigning the first communication device to a first time period in a TDMA cycle; and
assigning the second communication device to a second time period in the TDMA cycle,
wherein the first frequency channel includes an optimal channel selected from the group of non-overlapping frequency channels, and interference at the first communication device on the optimal channel is less than interference at the first communication device on one or more remaining frequency channels from the group of non-overlapping frequency channels.

12. The computer-readable storage medium of claim 11, wherein coordinating the transition from the CSMA mode to the hybrid CSMA-TDMA mode further includes assigning a multiple number of the plurality of communication devices to respective optimal channels selected from the group of non-overlapping frequency channels and assigning each of the multiple number of the plurality of communication devices to particular time periods in the TDMA cycle.

13. The computer-readable storage medium of claim 12, wherein the operations further comprise, prior to assigning each of the multiple number of the plurality of communication devices to particular time periods in the TDMA cycle:
dividing the TDMA cycle into a plurality of periods including the particular time periods, a number of the plurality of periods being determined based on a number of distinct frequency channels to which the plurality of communication devices are assigned; and
determining a length of each of the plurality of periods based on a quantity of the plurality of communication devices and an average traffic amount for the plurality of communication devices.

14. The computer-readable storage medium of claim 12, wherein the operations further comprise:
prior to coordinating the transition from the CSMA mode to the hybrid CSMA-TDMA mode, determining that a current RSSI of each of the multiple number of the plurality of communication devices is less than a corresponding one of the plurality of switching thresholds; and
prior to assigning the first communication device and the multiple number of the plurality of communication devices to respective optimal channels, requesting and receiving an identification of the respective optimal channels from the first communication device and the multiple number of the plurality of communication devices.

15. The computer-readable storage medium of claim 10, wherein the operations further comprise:

prior to determining the plurality of switching thresholds, receiving, from each of the plurality of communication devices, the respective first RSSI; and prior to determining that the current RSSI of the first communication device is less than the first switching threshold, periodically receiving a corresponding current RSSI from each of the plurality of communication devices.

16. The computer-readable storage medium of claim 10, wherein:

each of the plurality of switching thresholds is further based on an average amount of traffic of the respective one of the plurality of communication devices; and a switching threshold for a communication device having a relatively high average amount of traffic is lower than a switching threshold for a communication device having a relatively low average amount of traffic.

17. The computer-readable storage medium of claim 10, wherein:

in the CSMA mode, the wireless access point and the plurality of communication devices implement a CSMA protocol on the initial frequency channel; and in the hybrid CSMA-TDMA mode:

the wireless access point and a first subset of the plurality of communication devices implement the CSMA protocol during a first time period in a TDMA cycle on the first frequency channel, the first subset of the plurality of communication devices including the first communication device; and the wireless access point and a second subset of the plurality of communication devices implement the CSMA protocol during a second time period in the TDMA cycle on the initial frequency channel that does not overlap with the first frequency channel, the second subset of the plurality of communication devices including the second communication device.

18. The computer-readable storage medium of claim 10, wherein the operations further comprise:

determining that a source of interference with the initial frequency channel has disappeared, the source of interference having caused the current RSSI of the first communication device to be reduced to a value below the first switching threshold; and in response to determining that the source of interference has disappeared, coordinating a transition by the wireless access point and the plurality of communication devices from the hybrid CSMA-TDMA mode to the CSMA mode on the initial frequency channel.

* * * * *